US007584822B2

(12) United States Patent
Catron et al.

(10) Patent No.: US 7,584,822 B2
(45) Date of Patent: Sep. 8, 2009

(54) NOISE LEVEL REDUCTION OF SPARGER ASSEMBLIES

(75) Inventors: Frederick Wayne Catron, Marshalltown, IA (US); Charles Lawrence DePenning, Nevada, IA (US); Allen Carl Fagerlund, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 1381 days.

(21) Appl. No.: 10/638,085

(22) Filed: Aug. 8, 2003

(65) Prior Publication Data

US 2005/0029361 A1 Feb. 10, 2005

(51) Int. Cl.
*F16L 55/04* (2006.01)

(52) U.S. Cl. ....................... 181/268; 181/224; 181/264; 251/127

(58) Field of Classification Search ................. 181/224, 181/264, 268; 251/127
See application file for complete search history.

(56) References Cited

U.S. PATENT DOCUMENTS

| | | | | |
|---|---|---|---|---|
| 3,227,240 A | | 1/1966 | Lee et al. | |
| 3,612,212 A | | 10/1971 | Macdonald et al. | |
| 3,762,498 A | | 10/1973 | May et al. | |
| 3,910,375 A | | 10/1975 | Hache et al. | |
| 4,108,276 A | | 8/1978 | Hall et al. | |
| 4,252,611 A | * | 2/1981 | Mizumachi et al. | 376/283 |
| 4,401,269 A | | 8/1983 | Eiler | |
| 4,402,485 A | * | 9/1983 | Fagerlund | 251/118 |
| 4,474,259 A | | 10/1984 | Wright | |
| 4,526,743 A | * | 7/1985 | Yamanari et al. | 376/283 |
| 4,548,034 A | | 10/1985 | Maguire | |
| 4,592,201 A | | 6/1986 | Dusa et al. | |
| 4,762,540 A | | 8/1988 | Ruiz et al. | |
| 5,157,916 A | | 10/1992 | Wynosky et al. | |
| 5,516,466 A | * | 5/1996 | Schlesch et al. | 261/117 |
| 5,769,122 A | | 6/1998 | Baumann et al. | |
| 5,771,681 A | | 6/1998 | Rudolph | |

(Continued)

FOREIGN PATENT DOCUMENTS

| | | |
|---|---|---|
| CH | 362093 | 7/1962 |

(Continued)

OTHER PUBLICATIONS

"Dangerous Noise Level Problem Solved in Industrial Back-Pressure Turbine", CCI Solutions, 2000, XP002306261, www.ccisolutionsonline.com, retrieved on Nov. 17, 2004.

(Continued)

*Primary Examiner*—Jeffrey Donels
*Assistant Examiner*—Jeremy Luks
(74) *Attorney, Agent, or Firm*—Marshall, Gerstein & Borun LLP

(57) ABSTRACT

A method results in a system configuration wherein positioning a plurality of spargers reduces noise levels caused by fluid passing through the plurality of spargers. The method includes providing the plurality of spargers, each sparger having a center line access and an outer diameter measurement. Each of the plurality of spargers is positioned in a manner such that a ratio of the distance between the center line access of each sparger to the outer diameter measurement of each sparger is greater than a pre-determined ratio value. A greater ratio results in a reduction of noise emitted.

9 Claims, 5 Drawing Sheets

U.S. PATENT DOCUMENTS

| | | | | |
|---|---|---|---|---|
| 5,941,281 | A | 8/1999 | Baumann et al. | |
| 5,943,856 | A | 8/1999 | Lillibridge et al. | |
| 6,012,281 | A | 1/2000 | Hauser | |
| 6,026,859 | A | 2/2000 | Wears et al. | |
| 6,088,418 | A * | 7/2000 | Martin | 376/283 |
| 6,233,937 | B1 | 5/2001 | Gray | |
| 6,244,297 | B1 | 6/2001 | Baumann | |
| 6,486,371 | B1 * | 11/2002 | Butler et al. | 585/449 |
| 2003/0066783 | A1 * | 4/2003 | Butler et al. | 208/106 |
| 2004/0177613 | A1 | 9/2004 | DePenning et al. | |

FOREIGN PATENT DOCUMENTS

EP 1 319 435 12/2002

OTHER PUBLICATIONS

"Recent Advancements in Turbine Bypass Control Valves", John Wilson, Fisher Controls International, Inc., USA, Power Generation, Oct. 2003, retrieved from www.documentatin,frco.c.pdf., on Nov. 17, 2004.

International Search Report for International Patent Application No. PCT/USO4/023150, dated Nov. 29, 2004, 7 pages.

Written Opinion for International Patent Application No. PCT/USO4/023150, dated Nov. 29, 2004, 5 pages.

* cited by examiner

NOISE LEVEL REDUCTION OF SPARGER ASSEMBLIES

FIELD OF THE INVENTION

The present invention relates to a method for reducing noise levels of spargers, and more particularly to a method of spacing spargers in turbine bypass applications to reduce the level of noise from the spargers.

BACKGROUND OF THE INVENTION

Conventional power generating stations, or power plants, can use steam turbines to generate power. In a conventional power plant, steam generated in a boiler is fed to a turbine where the steam expands as it turns the turbine to generate work to create electricity. Occasional maintenance and repair of the turbine system is required. During turbine maintenance periods, or shutdown, the turbine is not operational. It is typically more economical to continue boiler operation during these maintenance periods, and as a result, the power plant is designed to allow the generated steam to continue circulation. To accommodate this design, the power plant commonly has supplemental piping and valves that circumvent the steam turbine and redirect the steam to a recovery circuit that reclaims the steam for further use. The supplemental piping is conventionally known as a turbine bypass.

In turbine bypass, steam that is routed away from the turbine must be recovered or returned to water. The recovery process allows the power plant to conserve water and maintain a higher operating efficiency. An air-cooled condenser is often used to recover steam from the bypass loop and turbine-exhausted steam. To return the steam to water, a system is required to remove the heat of vaporization from the steam, thereby forcing the steam to condense. The air-cooled condenser facilitates heat removal by forcing low temperature air across a heat exchanger in which the steam circulates. The residual heat is transferred from the steam through the heat exchanger directly to the surrounding atmosphere.

Because the bypass steam has not produced work through the turbine, the steam pressure and temperature is greater than the turbine-exhausted steam. As a result, bypass steam temperature and pressure must be conditioned or reduced prior to entering the air-cooled condenser to avoid damage. Cooling water is typically injected into the bypass steam to moderate the steam's temperature. To control the steam pressure prior to entering the condenser, control valves, and more specifically, fluid pressure reduction devices, commonly referred to as spargers, are used. The spargers are restrictive devices that reduce fluid pressure by transferring and absorbing fluid energy contained in the bypass steam. Conventional spargers are constructed of a cylindrical, hollow housing or a perforated tube that protrudes into the turbine exhaust duct. The bypass steam is transferred by the sparger into the duct through a multitude of fluid passageways to the exterior surface. By dividing the incoming fluid into progressively smaller, high velocity fluid jets, the sparger reduces the flow and the pressure of the incoming bypass steam and any residual cooling water within acceptable levels prior to entering the air-cooled condenser.

In the process of reducing the incoming steam pressure, the spargers transfer the potential energy stored in the steam to kinetic energy. The kinetic energy generates turbulent fluid flow that creates unwanted physical vibrations in surrounding structures and undesirable aerodynamic noise. In power plants with multiple steam generators, multiple spargers are mounted into the turbine exhaust duct. Because of space limitations within the duct, the spargers are generally spaced very closely. Additionally, the fluid jets, consisting of high velocity steam and residual spray water jets, exiting the closely spaced spargers can interact to substantially increase the aerodynamic noise. In an air-cooled condenser system, turbulent fluid motion can create aerodynamic conditions that induce physical vibration and noise with such magnitude as to exceed governmental safety regulations and damage the steam recovery system. The excessive noise can induce damaging structural resonance or vibration within the turbine exhaust duct. Therefore, it is desirable to develop a device and/or a method to substantially reduce these harmful effects.

FIG. 1 illustrates a conventional power plant employing a turbine bypass system 100. A boiler or re-heater 102 generates steam. The steam can travel through a turbine 104 to generate rotational mechanical energy and power a generator 114 to create electricity. The steam then continues through the turbine 104 to a condenser 106 before returning to the boiler or re-heater 102. In bypass mode, the steam travels through a bypass valve 108 with additional water supplied by a bypass water valve 110, before entering the condenser 106. A digital controller 112 controls the operation of the bypass valve 108 and the bypass water valve 110. A sparger assembly can be included along the bypass path after the bypass valve 108 to condition the steam prior to entering the condenser 106. The sparger assembly can often generate a substantial amount of noise as the steam pressure and temperature are reduced.

SUMMARY OF THE INVENTION

There is a need in the art for positioning spargers to reduce overall noise levels generated by steam passing therethrough. The present invention is directed toward further solutions to address this need.

In accordance with one example embodiment of the present invention, multiple spargers are positioned to reduce noise levels caused by fluid passing through the assembly. Each sparger extends along an axis, such as a centerline axis. The spargers are disposed or positioned in a manner such that a ratio (S/D) of the distance (S) between the center line axis of each sparger to the outside surface or outer diameter (D) of each sparger is greater than a pre-determined ratio value.

In accordance with one aspect of the present invention, a plurality of spargers are positioned within a turbine exhaust duct. The distance between the centerline axis of each sparger can be varied or adjusted to increase the ratio and reduce the noise levels resulting therefrom. The distance between the centerline axis of each sparger can also be adjusted or varied to reduce an overall footprint of the assembly of spargers.

In accordance with further aspects of the present invention, the fluid passing through each of the spargers can be in the form of steam. Each of the spargers can further include a plurality of vents disposed to regularly vent the fluid.

In accordance with one embodiment of the present invention, a method is provided of positioning a plurality of spargers to reduce noise levels caused by fluid passing through the plurality of spargers. The method includes providing the plurality of spargers, each sparger having a center line access and an outer diameter measurement. Each of the plurality of spargers is positioned in a manner such that a ratio of the distance between the center line access of each sparger to the outer diameter measurement of each sparger is greater than a pre-determined ratio value.

BRIEF DESCRIPTION OF THE DRAWINGS

The present invention will become better understood with reference to the following description and accompanying drawings, wherein.

DETAILED DESCRIPTION

Figure 1:
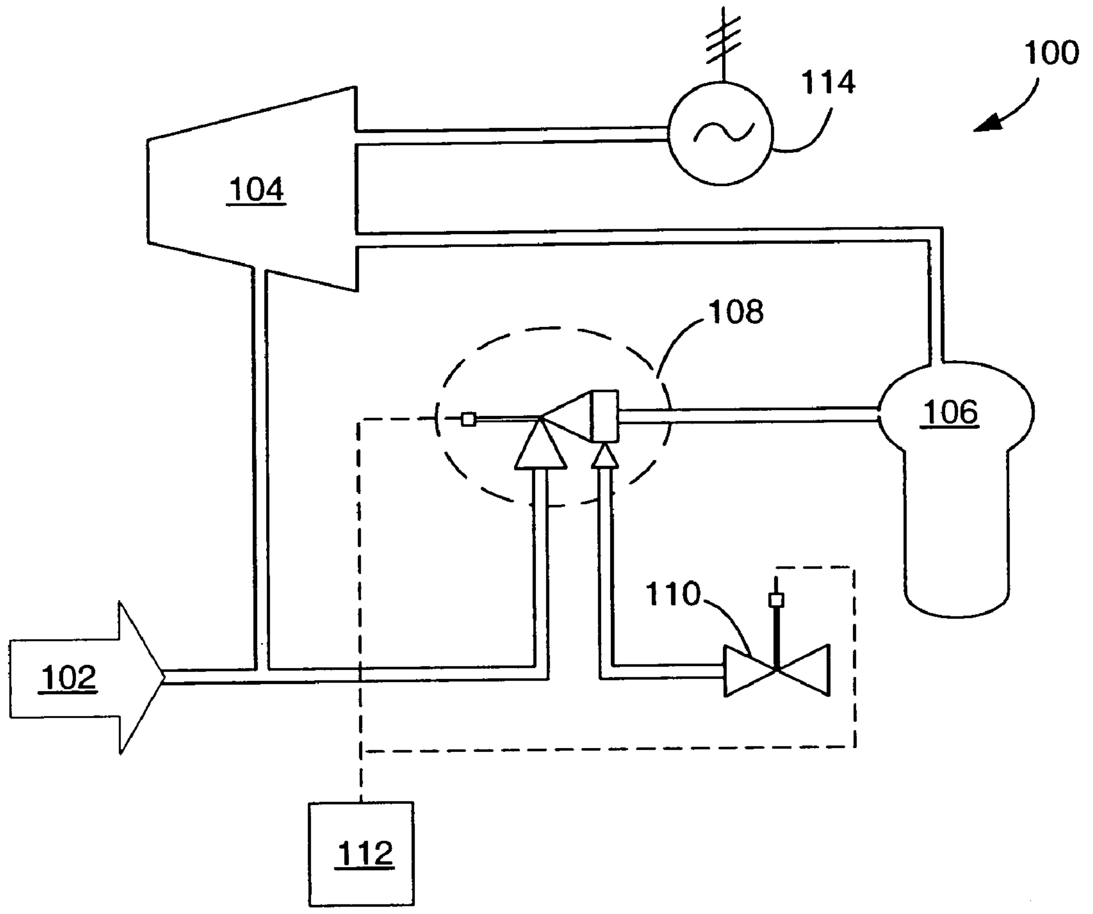
FIG. 1 PRIOR ART
FIG. 1 is a diagrammatic illustration of a conventional steam cycle, according to one aspect of the present invention.

An illustrative embodiment of the present invention relates to a ratio measurement formed by comparing a distance between the centerline axis and the outer diameter or surface of each sparger in a sparger assembly. The ratio is hereinafter referred to as the "S/D ratio", The S/D ratio can be used in a method to determine the optimal spacing between two or more spargers in an assembly. For example, in an air-cooled condenser plant, there is conventionally more than one sparger inserted into the turbine exhaust duct. Convention for such an application is to have the spargers take up the least amount of cross-sectional area within the turbine exhaust. To minimize the occupied area, the spargers are spaced consecutively in a row relatively close to each other.

It has been determined in accordance with the teachings of the present invention that when the S/D ratio is relatively small, noise caused by fluid passing through the spargers is relatively significant. However, the present inventors have realized that as the S/D ratio is increased, the noise generated by the fluid passing through the sparger is reduced. Varying the S/D ratio in a specific manner, to a specific ratio, can greatly decrease the development of the interacting flow within the turbine exhaust duct. This in turn greatly decreases the noise levels of the turbine bypass circuit.

FIGS. 2 through 5B, wherein like parts are designated by like reference numerals throughout, illustrate an example embodiments of a sparger assembly according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

Figure 2:
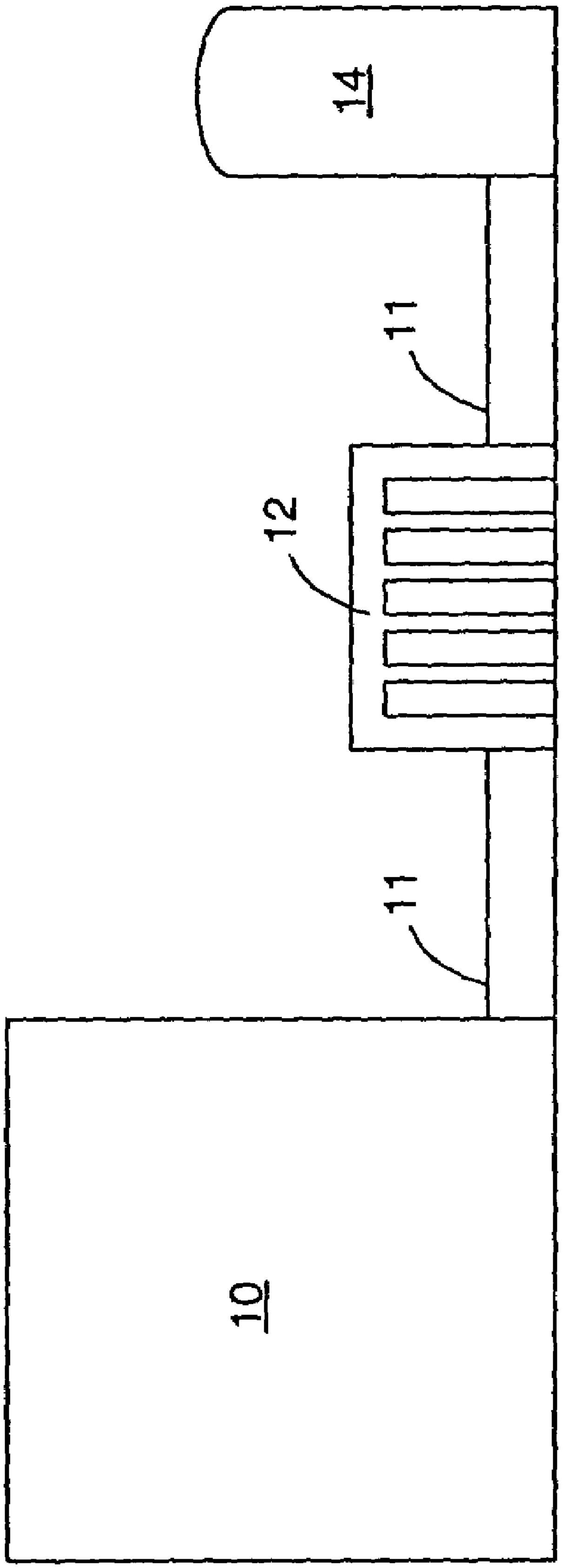
FIG. 2 is a diagrammatic illustration of a steam cycle including a sparger assembly according to one aspect of the present invention.

FIG. 2 is a diagrammatic illustration showing a conventional sparger assembly 12, within a steam driven system 10. As discussed previously, the system can be a manufacturing process, power generation process, or some other industrial process as understood by one of ordinary skill in the art. The sparger assembly 12 is disposed along a duct 11 travelling from the steam driven system to a condenser 14. As can be seen in this illustration, the sparger assembly 12 is placed in the path between the steam driven system 10 and the condenser 14 to condition the steam prior to the steam reaching the condenser 14. In this arrangement, the sparger assembly 12 can have the desired effects of lowering pressure and temperature of the steam, to prevent high pressure super heated steam from directly entering the condenser 14 and causing damage to the condenser 14.

Because of space restrictions, the sparger assembly 12 is often disposed in a relatively small space between the steam driven system 10 and the condenser 14. As such, individual spargers within the sparger assembly 12 are often placed side by side in a row in relatively close proximity. In close sparger proximity, and without the benefit of the present invention, steam exiting any one sparger interferes with steam exiting another of the proximate spargers in the sparger assembly 12 and creates unwanted noise of highly undesirable levels.

Figure 3A:
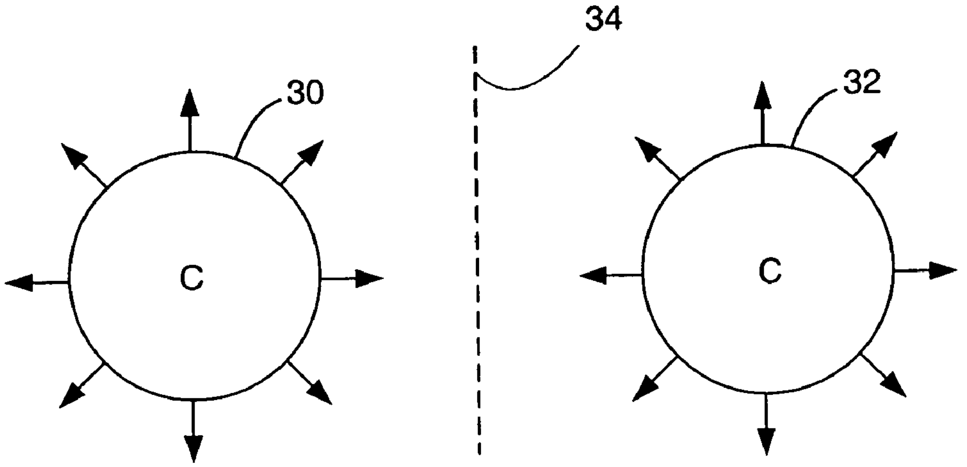
FIGS. 3A and 3B are diagrammatic illustrations of sparger fluid emission and interaction, according to one aspect of the present invention.
Figure 3B:
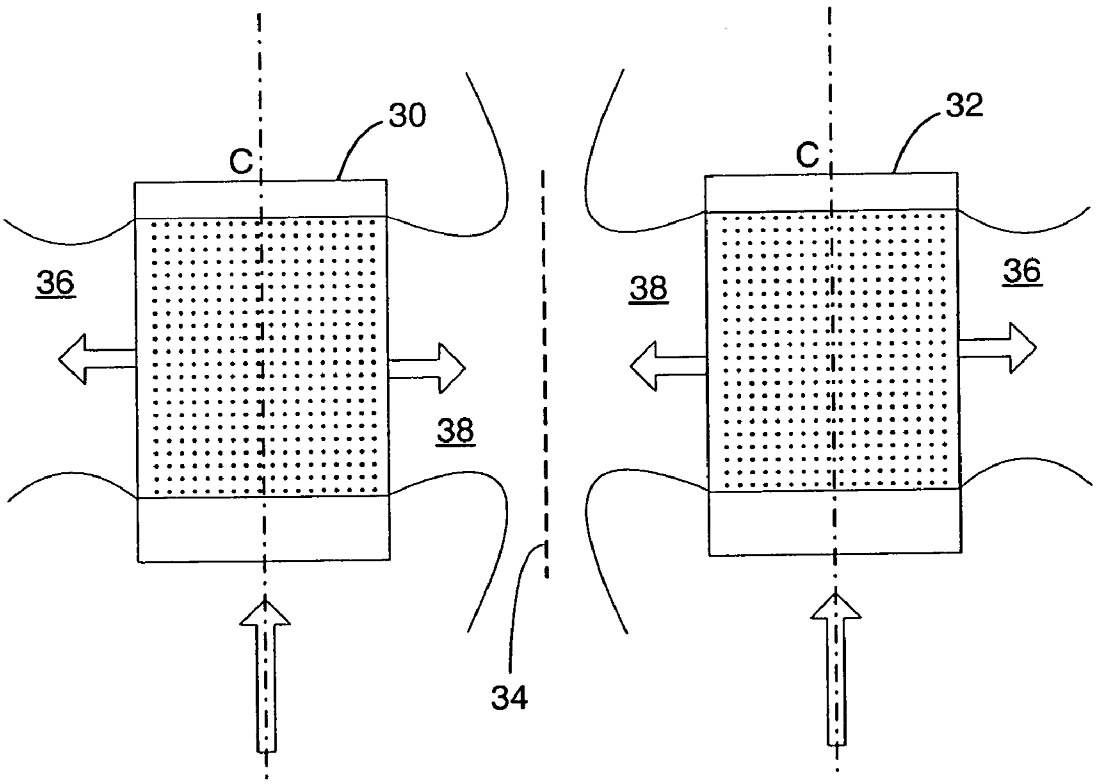

FIGS. 3A and 3B are diagrammatic illustrations of sparger fluid emission and interaction. FIG. 3A is a top view of two example spargers, a first sparger 30 and a second sparger 32. The fluid is radially emitted from the first sparger 30 and the second sparger 32 in the direction of the radial arrows shown. Where there are two spargers positioned proximate to each other, there is an interaction zone 34, which is essentially the approximate location where emitting fluid from the first sparger 30 intersects and interacts with emitting fluid from the second sparger 32. The interaction zone 34 established by the closely spaced spargers facilitates a recombination of the radial flow from each sparger that substantially increases the aerodynamic noise generated by the spargers. FIG. 3B shows a side view of the first sparger 30 and the second sparger 32, with the corresponding interaction zone 34. Fluid emission 36 outside of the interaction zone 34 simply dissipates to the atmosphere, unless there are other obstructions surrounding the spargers. Fluid emission 38 in the interaction zone 34 collides to create the aerodynamic noise, which can be limited in accordance with the practice of the present invention.

Figure 4A:
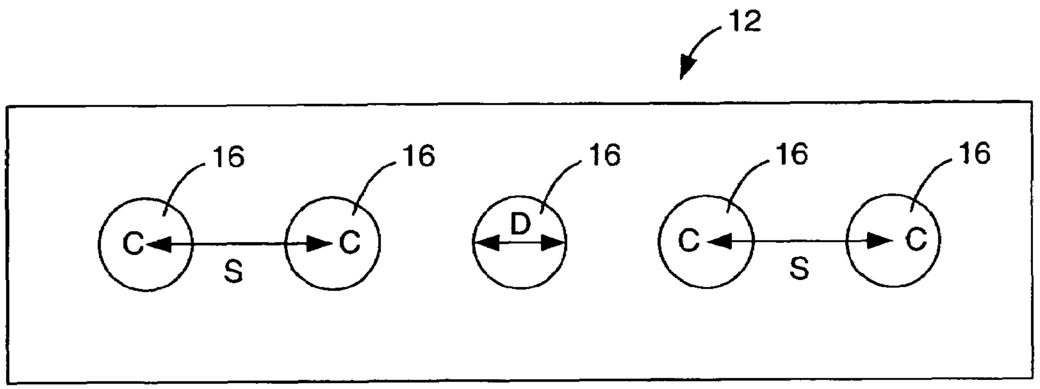
FIGS. 4A and 4B are a top view and side view respectively of the assembly of spargers according to one aspect of the present invention.
Figure 4B:
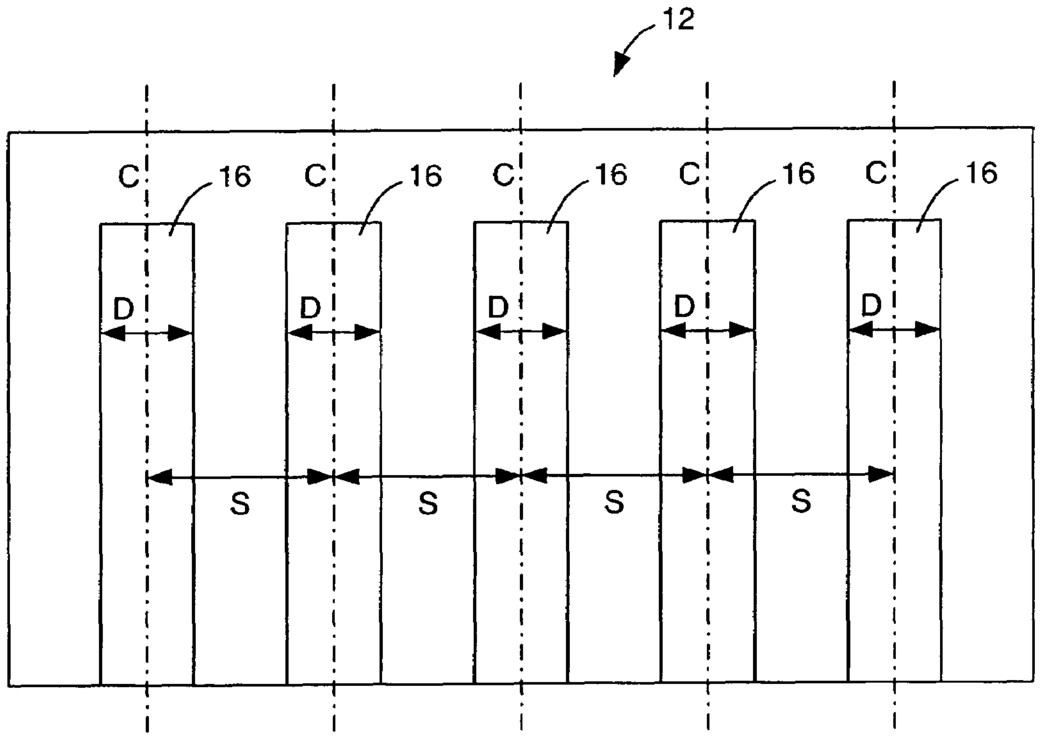

FIGS. 4A and 4B illustrate the sparger assembly 12 from FIG. 2 from the perspectives of a top view and a side view. In accordance with the teachings of the present invention, the spacing of each sparger 16 within the sparger assembly 12 is determined to ultimately reduce the noise produced by steam exiting each of the spargers 16, while concomitantly positioning the spargers 16 as close together as possible to conserve space. As shown in FIGS. 4A and 4B, each sparger 16 has an outer diameter D. The outer diameter D is often the same for each of the spargers 16 within a given sparger assembly 12. However, the outer diameter D can vary with each sparger 16. In the illustrated embodiment, each of the spargers 16 has the same outer diameter D. In addition, each of the spargers 16 has a center point C. The center point C is located in the center of each of the circular spargers 16. If the sparger 16 maintains a cross-sectional shape different from a circular shape, the center point C is determined based on conventional geometric calculations.

A spacing distance S is a measurement of the distance between each center point C of each sparger 16. The spacing distance S is a representation, therefore, of the overall distance between each of the spargers 16 within the sparger assembly 12.

FIG. 4B is a side view illustration of the sparger assembly 12 shown in FIG. 4A. The center point C is shown with a center line axis. Each sparger 16 extends along the center line axis. The outer diameter D and spacing distance S of the sparger 16 in the assembly is also shown.

In accordance with the teachings of the present invention, a ratio can be determined representing the spacing between each of the spargers 16 within the sparger assembly 12. The ratio is identified as the S/D ratio. The S/D ratio is calculated as follows. The spacing distance S between each center point C of each sparger 16 in the sparger assembly 12 is divided by the outer diameter D of each sparger 16 to form the S/D ratio.

The S/D ratio can be determined or varied to control the ultimate level of noise emitted from the sparger assembly 12 in any given application. The spacing distance S increases and thus, the S/D ratio increases, as the spargers 16 are spaced further apart. In addition, as the spacing distance S increases, there is a decreased likelihood of the fluid exiting from the spargers 16 colliding and recombining with fluid exiting from adjacent spargers 16 to create unwanted aerodynamic noise. With an increased spacing distance S, the S/D ratio also increases.

The present inventors have realized that in common applications of spargers 16 and sparger assemblies 12, an S/D ratio of less than about two results in a substantial level of noise. For example, in a comparison of different noise levels resulting from fluid emission from a representative sparger assembly similar to that shown in FIGS. 4A and 4B, the following results were achieved as illustrated in Table 1.

TABLE 1

| S/D RATIO | Noise (dBA) |
|---|---|
| 2.5 | 113 |
| 4 | 111 |
| 5 | 107 |
| 6 | 102 |

As illustrated in Table 1, with an increasing S/D ratio, between about 2.5 and about 6, the sound level emitted from each sparger decreased. It should be noted that the noise level at each sparger at a given S/D ratio can differ slightly. This is due to other environmental factors, including air flow past the sparger, turbulence created by the fluid emitting from the surrounding spargers, in addition to other factors as understood by one of ordinary skill in the art. However, it is clear that at an S/D ratio of about 2.5, the noise levels emitted are far greater than at an S/D ratio of about 6.

Figure 5A:
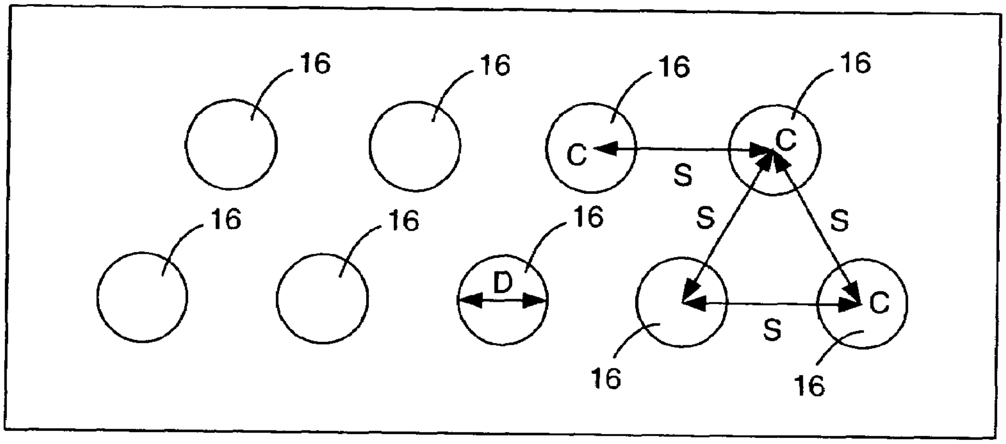
FIGS. 5A and 5B are top view illustrations of additional configurations for the sparger assembly according to one aspect of the present invention.
Figure 5B:
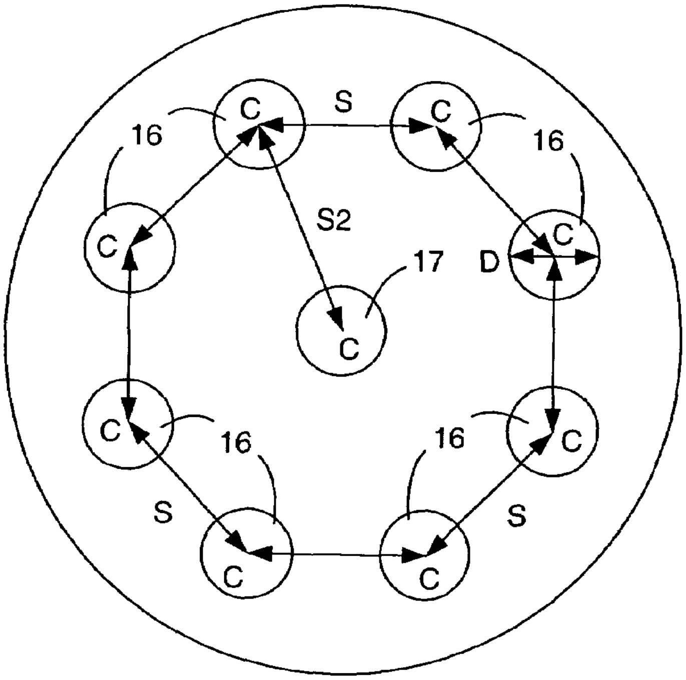

FIGS. 5A and 5B illustrate additional embodiments of sparger assemblies. A sparger assembly 18 is provided in FIG. 5A. In the sparger assembly 18, each of the spargers 16 is placed to form adjacent staggered rows. Each of the spargers 16 has center points C, and the spacing distance S can be measured between each of the center points C. Thus, the S/D ratio can be determined by spacing the sparger 16 an equal distance in both a straight row and an adjacent row. The spacing distance S can then dictate the spacing of each sparger 16 in each row.

FIG. 5B shows still another sparger assembly 20. In this sparger assembly 20, the spargers 16 are shown in a circular configuration. The spacing distance S between the center points of each of the spargers is measured as shown. In addition, a sparger 17 is disposed at the center of the circular configuration. This sparger, as shown, maintains a spacing distance S2 that is different from the spacing distance S between the other spargers 16 in the sparger assembly 20. The larger spacing distance S2 illustrates that the spacing distance between each of the spargers 16 in any one sparger assembly 12, 18, and 20 does not have to be uniform. The larger spacing distance S2, because it represents a greater distance than that of the spacing distance S, will have no effect on increasing noise resulting from fluid passing through the sparger 16 and 17.

It should be noted that the desire for greater spacing to create a larger S/D ratio is constrained by the space provided within the system. As mentioned previously, the location of spargers in a system often is dictated by other space constraints, and spargers are often tightly configured in a relatively small space. When calculating the S/D ratio, and a desired noise level, the greater the spacing, the less noise generated by fluid collision. However, external parameters may prevent the spacing of spargers to achieve an ideal S/D ratio. In such instances, the spargers are placed in a manner that achieves an S/D ratio as close to ideal as possible, with a resulting noise level being within a desired range.

It should further be noted that although the example embodiments described herein refer to steam forming the fluid, the fluid need not be restricted to steam. The fluid can be any form of compressible fluid as understood by one of ordinary skill in the art.

The S/D ratio can be used in a method to determine the optimal spacing between two or more spargers in a particular application. It has been determined in accordance with the teachings of the present invention that when the S/D ratio is relatively small, noise caused by fluid passing through the spargers is relatively significant. However, as the S/D ratio is increased in the sparger assembly, the noise generated by the fluid passing through the sparger is reduced. Varying the S/D ratio in a specific manner, to a specific ratio, can greatly decrease the impact the interacting flow has on the turbine exhaust duct. This in turn greatly decreases the noise levels outside of the turbine exhaust duct.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

What is claimed is:

1. A method of positioning a plurality of spargers, comprising:

producing steam in a boiler;

routing the steam through a turbine bypass line;

reducing the fluid pressure of the steam in the turbine bypass line by transferring a portion of the steam through the plurality of spargers, each of the plurality of spargers having a centerline axis, an outer diameter, and at least one exit aperture;

positioning the exit aperture of each of the plurality of spargers in the interior of a turbine exhaust duct such that the steam transferred to the plurality of spargers is expelled into the turbine exhaust duct;

positioning each of the plurality of spargers such that a ratio of the distance between the centerline axis of each of the plurality of spargers and the outer diameter of each of the plurality of spargers is greater than a predetermined ratio value to reduce aerodynamic noise and physical vibrations within the exhaust duct caused by an interaction of steam expelled from each of the plurality of spargers; and transferring the reduced-pressure steam in the bypass line to a condenser.

2. The method of claim 1, further comprising, when positioning each of the plurality of spargers, increasing the distance between the centerline axis of each sparger to increase the ratio and thereby reduce noise levels.

3. The method of claim 1, further comprising, when positioning each of the plurality of spargers, reducing the distance between the centerline axis of each sparger to reduce an overall footprint of the plurality of spargers.

4. The method of claim 1, wherein the ratio value is at least about 2.

5. The method of claim 1, wherein the ratio value is about 5.

6. The method of claim 1, wherein the ratio value is between about 2 and about 5.

7. The method of claim 1, further comprising positioning the plurality of spargers in a linear array.

8. The method of claim 1, further comprising positioning the plurality of spargers in a substantially circular configuration.

9. The method of claim 1, further comprising positioning the plurality of spargers in adjacent staggered rows.

* * * * *